(12) United States Patent
Tanaka

(10) Patent No.: US 11,546,130 B2
(45) Date of Patent: Jan. 3, 2023

(54) CONTROL METHOD OF OPTICAL TRANSCEIVER AND OPTICAL TRANSCEIVER

(71) Applicant: SUMITOMO ELECTRIC INDUSTRIES, LTD., Osaka (JP)

(72) Inventor: Hiromi Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 319 days.

(21) Appl. No.: 16/801,502

(22) Filed: Feb. 26, 2020

(65) Prior Publication Data

US 2020/0274690 A1 Aug. 27, 2020

(30) Foreign Application Priority Data

Feb. 27, 2019 (JP) .............................. JP2019-034582

(51) Int. Cl.
*H04L 7/04* (2006.01)
*G06F 13/24* (2006.01)

(52) U.S. Cl.
CPC .............. *H04L 7/048* (2013.01); *G06F 13/24* (2013.01)

(58) Field of Classification Search
CPC .......... H04L 7/048; G06F 13/24; H04B 10/40
USPC ........................................................ 714/775
See application file for complete search history.

(56) References Cited

U.S. PATENT DOCUMENTS

| 2012/0023358 A1* | 1/2012 | Nakamura | ............ G06F 1/3237 710/262 |
| 2015/0086211 A1* | 3/2015 | Coffey | ................ G02B 6/4284 398/116 |

FOREIGN PATENT DOCUMENTS

WO 2006-090473 8/2006

* cited by examiner

*Primary Examiner* — James C Kerveros
(74) *Attorney, Agent, or Firm* — Smith, Gambrell & Russell, LLP.

(57) ABSTRACT

A control method for an optical transceiver includes interrupting internal repetitive internal processing in response to a command from a host apparatus and executing an interrupt process for transmitting monitoring data. The method sets a processing mode of the interrupt process to a first processing mode when a processing time necessary to execute the interrupt process and one cycle of the repetitive processing is shorter than a threshold value, and to a second processing mode when the processing time necessary to execute the interrupt process and one cycle of the repetitive processing is longer than the threshold value. In the first mode, the interrupt process stores first monitoring data read out from a memory unit in a transmission register, stops the stretching of a clock signal, and subsequently reads out second monitoring data from the memory unit to follow the first monitoring data. In the second mode, the interrupt process stores the first monitoring data read out from the memory unit in the transmission register, reads out the second monitoring data from the memory unit, and subsequently stops the stretching of the clock signal.

8 Claims, 12 Drawing Sheets

CONTROL METHOD OF OPTICAL TRANSCEIVER AND OPTICAL TRANSCEIVER

CROSS-REFERENCE TO RELATED APPLICATION

This application claims priority from Japanese Patent Application No. 2019-034582, filed on Feb. 27, 2019, the entire subject matter of which is incorporated herein by reference.

TECHNICAL FIELD

The present invention relates to a control method of an optical transceiver and an optical transceiver.

BACKGROUND ART

WO 2006/090473 discloses a communication method that complies with the I²C (Inter-Integrated Circuit) interface specification. In the communication method disclosed in WO 2006/090473, a slave sets clock stretching when receiving 1-byte data from a master. When having judged that the received data is a request for transmitting data from the slave to the master, the slave transmits acknowledgment information to the master. Then the slave stops the clock stretching, transmits data stored in a transmission register, and reads out data to be transmitted next from a memory unit and stores the read-out data in a transmission register. In this manner, delay of transmission timing due to a data reading time is reduced.

Optical transceivers are known which perform data transmission and reception with a higher-level host apparatus using a communication method that complies with the I²C interface specification (hereinafter referred to as an "I²C communication method"). This data transmission and reception is performed to allow the host apparatus to monitor and control the optical transceiver rather than to enable high-speed transmission of traffic. The optical transceiver responds to a request from the host apparatus. The data transmission and reception for monitoring and control is performed irregularly rather than all the time. A control device installed in such optical transceivers sometimes executes another process repetitively in addition to performing data transmission and reception (I²C slave process) with a host apparatus. An example of such a process executed repetitively (repetitive process) is monitoring of optical signals that are output from a TOSA (transmitter optical sub-assembly) provided in an optical transceiver.

To allow the optical transceiver to perform a prescribed function, plural different processes are executed internally. Such plural processes are executed by, for example, a control device one by one sequentially. Each of the plural processes is executed repeatedly during operation of the optical transceiver. As such, the plural processes are executed one by one sequentially and are returned to the first process upon reaching the last process and executed again. The term "repetitive process" means plural processes that are executed repeatedly in this manner. When receiving a data transmission request from the host apparatus, the control device executes an I²C slave process preferentially as an interrupt process. That is, the control device needs to execute a repetitive process while no interrupt process is being executed.

In executing a repetitive process while transmitting data to the host apparatus using the communication method disclosed in WO 2006/090473, the control device executes, as an interrupt process, a process of performing judgment relating to a data transmission request received from the host apparatus and then reading out data to be transmitted next and storing the read-out data in a transmission register. In the communication method disclosed in WO 2006/090473, data to be transmitted next is read out in parallel with transmission of data stored in the transmission register after stopping of clock stretching. In this case, as the rate of communication between the control device and the host apparatus increases, the transmission time of one-byte data becomes shorter and hence the time interval from the end of one interrupt process to the next interrupt process becomes shorter. This may result in a problem that a repetitive process cannot be performed because of an insufficient time secured for it.

SUMMARY

One aspect of the disclosure provides a control method of an optical transceiver configured to receive a clock signal from an apparatus and transmit monitoring data stored in a memory unit to the apparatus in synchronism with the clock signal. The control method has the steps of executing a plurality of internal processes repetitively in a specific order; transmitting, bit by bit, data stored in a transmission register to the apparatus in synchronism with the clock signal; interrupting the executing step in response to a command from the apparatus, and stretching the clock signal and executing an interrupt process before the transmitting step; and setting a processing mode of the interrupt process to a first mode when one cycle of the executing step is shorter than a specific time, and setting the processing mode to a second mode when one cycle of the executing step is longer than the specific time. The interrupt process includes storing first data read out from the memory unit in the transmission register as monitoring data and stopping the stretching of the clock signal, and reading out second data from the memory unit as monitoring data to follow the first data, when the processing mode corresponds to the first mode; and stopping the stretching of the clock signal after storing the first data in the transmission register and reading out the second data from the memory unit, when the processing mode is set to the second mode.

DETAILED DESCRIPTION

Embodiment of the Disclosure

Specific examples of an optical transceiver and a control method of an optical transceiver according to an embodiment of the present disclosure will be hereinafter described with reference to the drawings. In the descriptions to be made with reference to the drawings, the same or equivalent items will be given the same symbol and will not be described redundantly.

(Configuration of Optical Transceiver)

Figure 1:
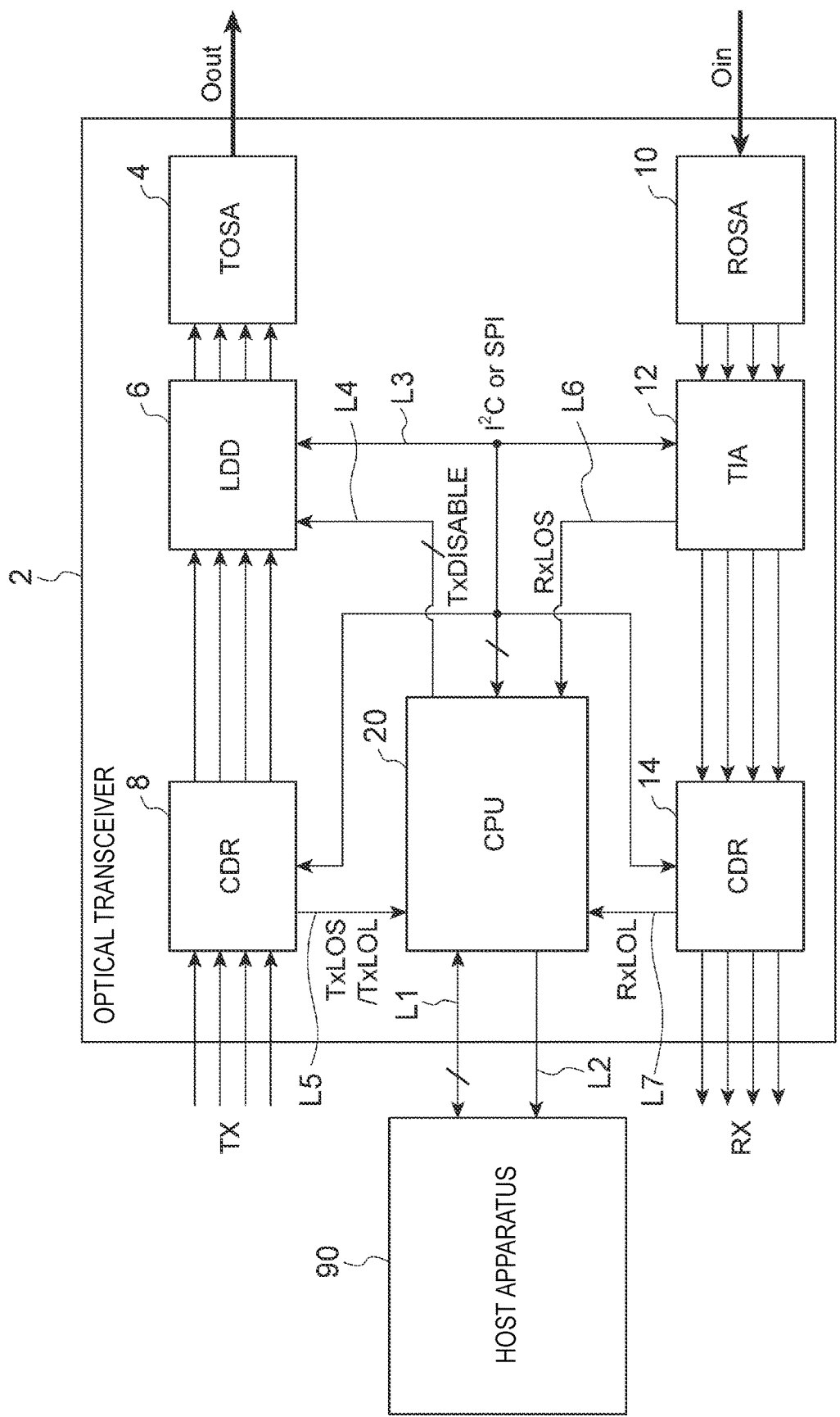
FIG. 1 is a block diagram outlining the configuration of an optical transceiver according to an embodiment.
Figure 2:
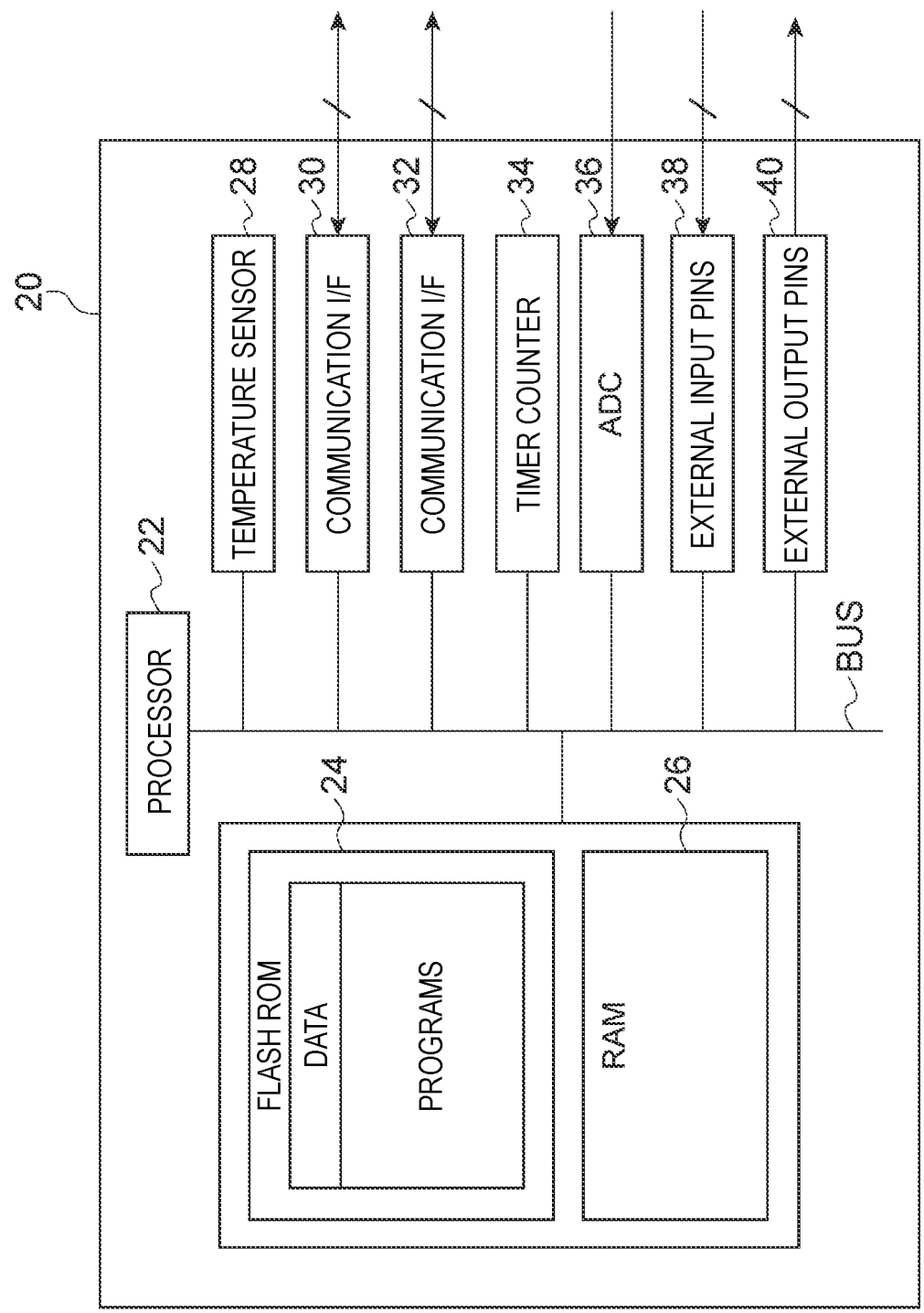
FIG. 2 is a block diagram showing the hardware configuration of a CPU shown in FIG. 1.
Figure 3:
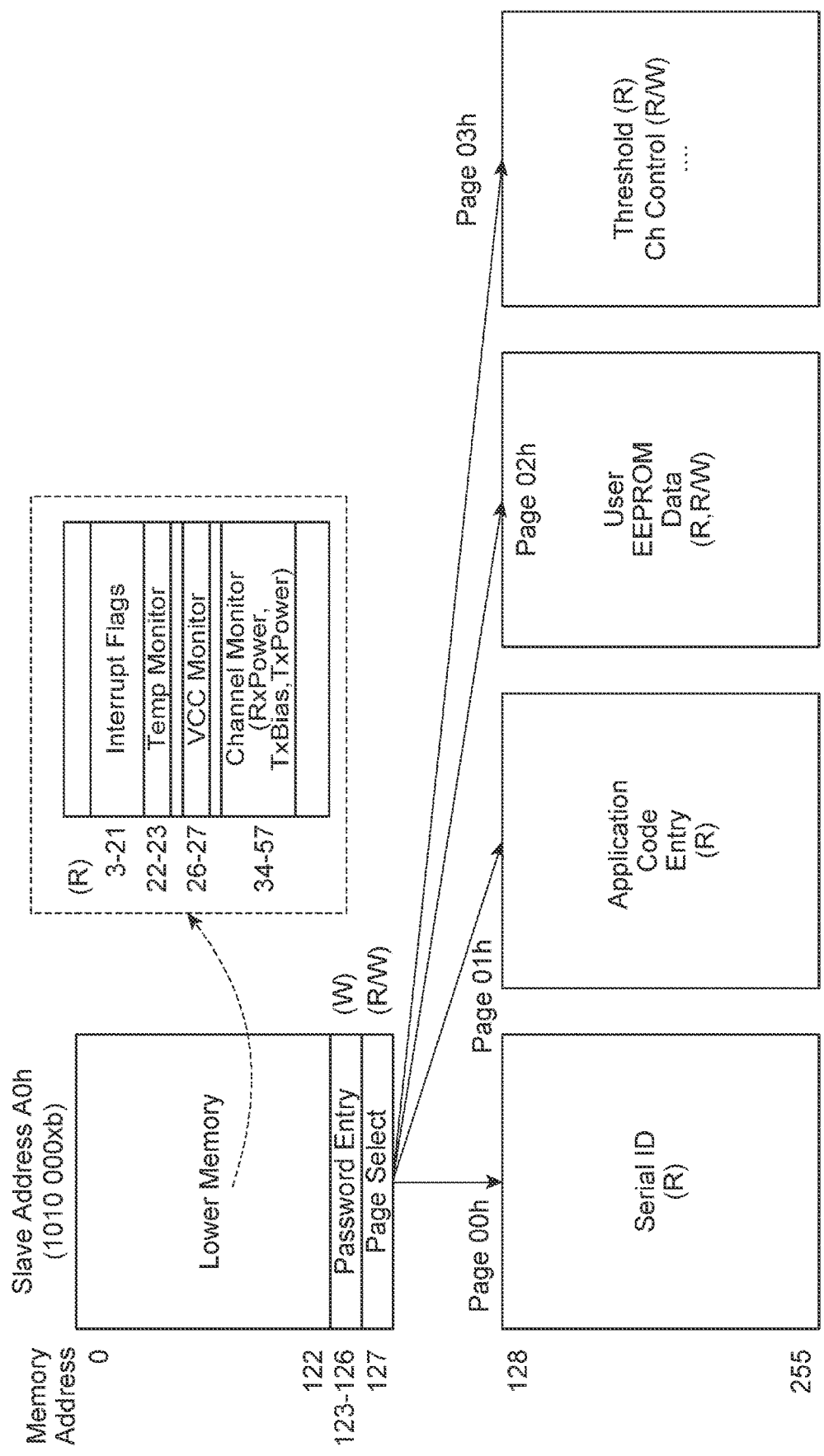
FIG. 3 is a diagram showing an example structure of a register memory map.
Figure 4:
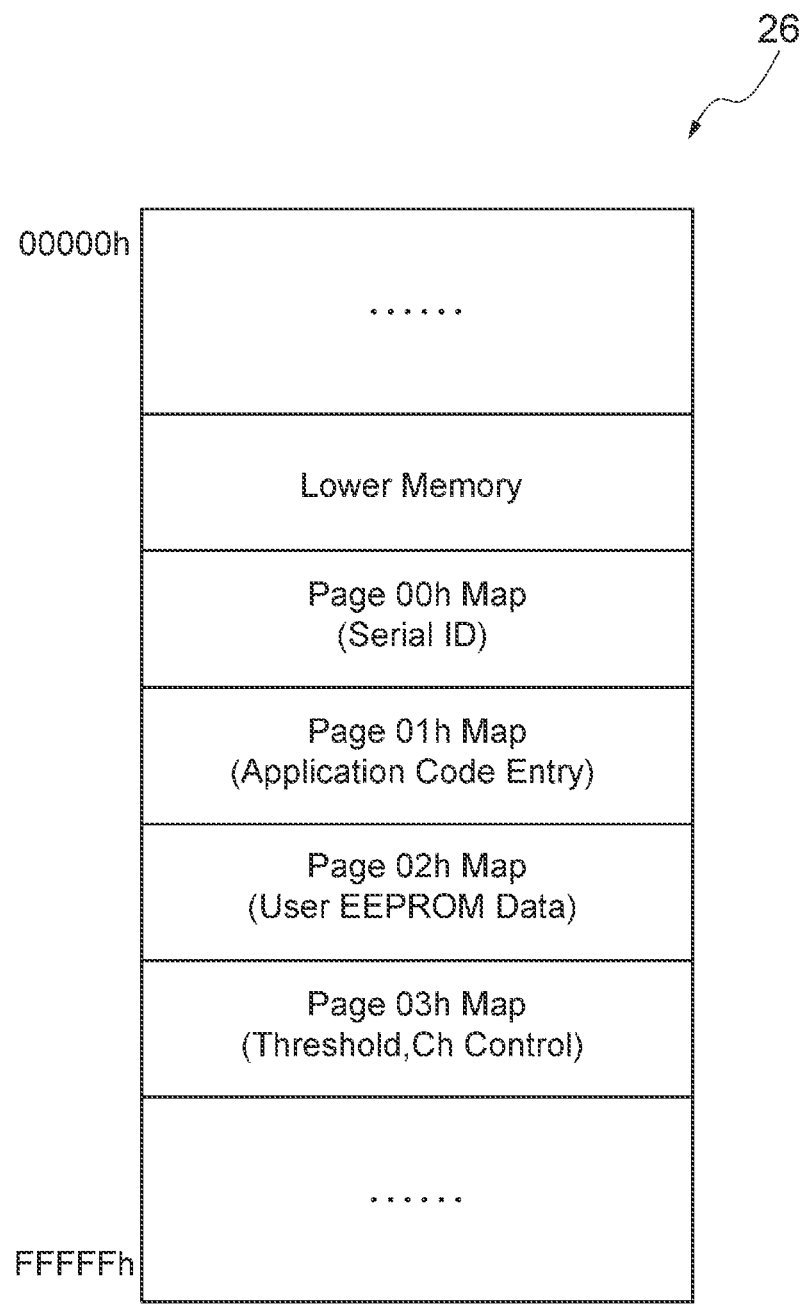
FIG. 4 is a diagram showing an example structure of a memory map in a RAM area of the CPU shown in FIG. 1.
Figure 5:
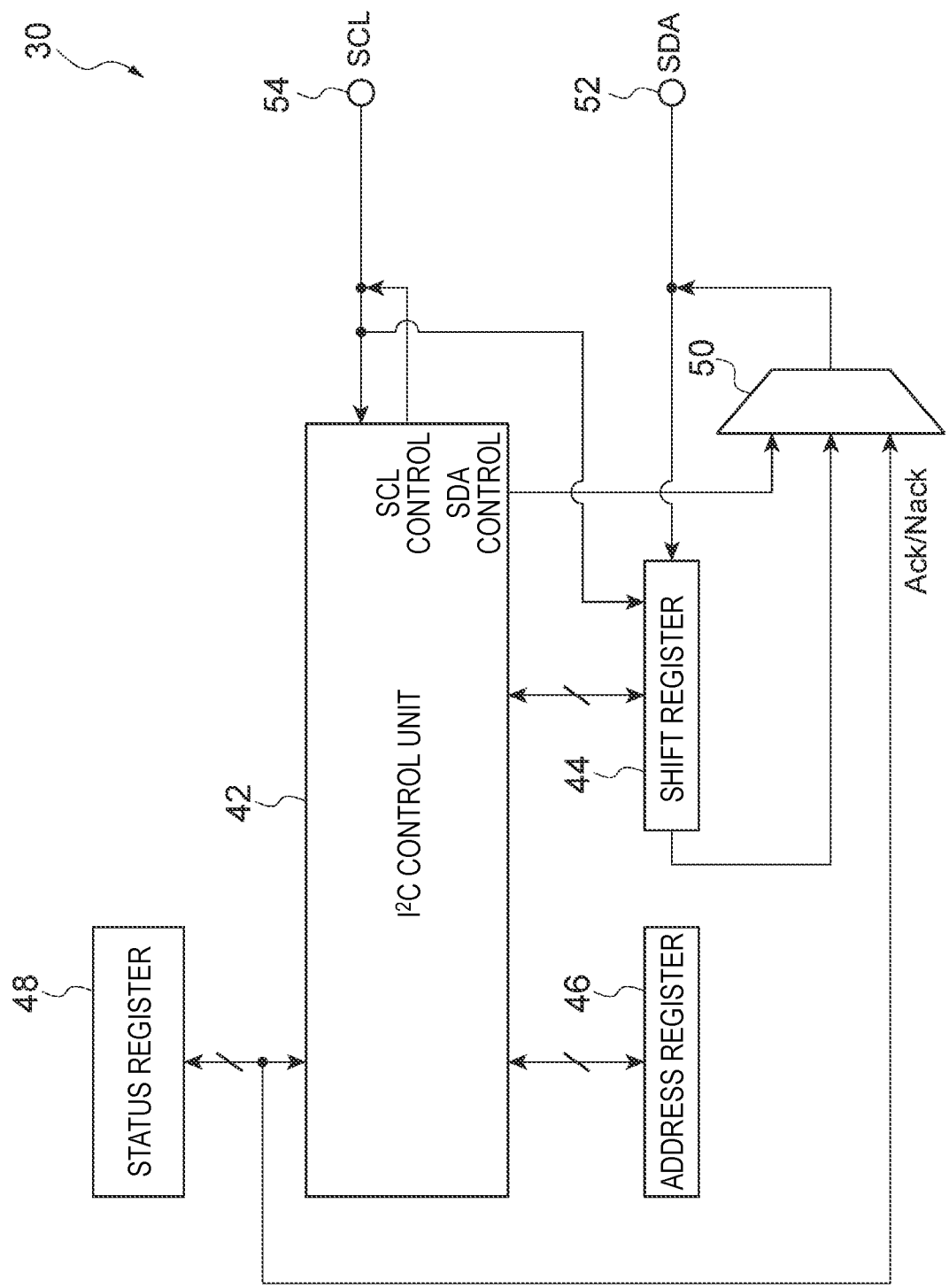
FIG. 5 is a block diagram showing a hardware configuration relating to I²C communication with a host apparatus in the CPU shown in FIG. 1.

FIG. 1 is a block diagram outlining the configuration of the optical transceiver according to an embodiment. FIG. 2 is a block diagram showing the configuration of a CPU shown in FIG. 1. FIG. 3 is a diagram showing an example structure of a register memory map. FIG. 4 is a diagram showing an example structure of a memory map in a RAM area of the CPU shown in FIG. 1. FIG. 5 is a block diagram showing a hardware configuration relating to I²C communication in the CPU shown in FIG. 1.

The optical transceiver 2 shown in FIG. 1 is a device that is used for transmitting and receiving an optical signal in an optical communication system or the like. The optical transceiver 2 is provided with a photo-electric mutual conversion function, an electrical waveform shaping function, etc. For example, the optical transceiver 2 complies with the QSFP28 (Quad Small Form-Factor Pluggable 28 Multi-Source Agreement) standard and realizes optical communication whose transmission rate is 100 Gbps or higher. As shown in FIG. 1, the optical transceiver 2 is connected to an external host apparatus 90 (higher-level host apparatus) by communication lines L1 and L2 so as to be able to communicate with it. Although electrical signals TX and RX are also exchanged between the optical transceiver 2 and the host apparatus 90, communication lines for those purposes are omitted in FIG. 1. The optical transceiver 2 is equipped with a TOSA 4, an LDD (laser diode driver) 6, a CDR (clock data recovery) 8, a ROSA (receiver optical sub-assembly) 10, a TIA (transimpedance amplifier) 12, a CDR 14, and a CPU (central processing unit) 20.

The TOSA 4 is a device for converting electrical signals into optical signals and transmitting the optical signals. For example, the TOSA 4 incorporates four laser diodes that are light-emitting elements for generating 4-channel optical signals (i.e., four optical signals having different peak wavelengths) and an optical combiner. Each laser diode incorporated in the TOSA 4 is an optical transmission device for converting an electrical signal into an optical signal by a direct modulation method. The TOSA 4 may further be equipped with an optical modulator and convert electrical signals into optical signals using the optical modulator. The term "channel" as used herein means a transmission path for transmitting an electrical signal or an optical signal. The plural channels mean plural transmission paths that are provided parallel with each other and transmit independent signals. The TOSA 4 generates 4-channel optical signals having different wavelengths on the basis of 4-channel electrical signals (electrical input signals) TX received from the external host apparatus 90, combines (multiplexes) the optical signals together by an optical combiner, and outputs a resulting multiplexed optical signal Out. The multiplexed optical signal Out includes four optical signals that have different wavelengths and carry independent pieces of information.

The LDD 6 is a circuit unit for driving the four laser diodes provided in the TOSA 4. The LDD 6 drives the four laser diodes provided in the TOSA 4 on the basis of 4-channel electrical signals TX. More specifically, the LDD 6 generates four drive signals for driving the four respective laser diodes provided in the TOSA 4. The TOSA 4 causes its four laser diodes to output optical signals modulated according to the drive signals, respectively. The TOSA 4 may drive the optical modulator instead of the laser diodes. The LDD 6 may be incorporated in the TOSA 4. The CDR 8 is a circuit unit for waveform-shaping the four electrical signals TX. When the electrical signals TX that are input to the LDD 6 are improved in waveform quality by the waveform shaping, the drive signals are also improved in waveform quality. As a result, the optical signals that are output from the laser diodes are improved in waveform quality, which contributes to improvement of the communication performance of the optical transceiver 2.

The ROSA 10 is a device for receiving optical signals and converting the received optical signals into electrical signals. The ROSA 10 incorporates four photodiodes that are photoreceiving elements for receiving 4-channel optical signals and an optical demultiplexer. Each photodiode provided in the ROSA 10 is an optical receiving element for converting an optical signal into an electrical signal. The ROSA 10 receives a multiplexed optical signal Oin from the outside and demultiplexes the multiplexed optical signal Oin into 4-channel optical signals having different wavelengths. The ROSA 10 generates 4-channel optical signals and converts them into respective photocurrents (electrical signals).

The TIA 12 is a circuit unit for converting photocurrents into electrical signals (electrical output signals) RX. The TIA 12 converts four photocurrents that are output from the 4-channel photodiodes provided in the ROSA 10 into respective electrical signals RX. The TIA 12 may be incorporated in the ROSA 10. The CDR 14 is a circuit unit for waveform-shaping the four electrical signals RX supplied from the TIA 12. Although the electrical signals RX that are output from the TIA 12 are high in jitter, the CDR 14 removes jitter from the electrical signals RX and outputs low-jitter electrical signals as easy-to-handle digital signals. The circuit constituting each of the CDRs 8 and 14 may be an integrated circuit (IC). The CDRs 8 and 14 may be integrated into a single circuit unit by, for example, being integrated in a single package. In other words, the optical transceiver 2 may be equipped with a transmission/reception-integrated CDR. The IC constituting each of the CDRs 8 and 14 may be a SERDES (serializer/deserializer) or a gearbox IC.

The CPU 20 functions as a controller (computation device) for controlling the individual elements in the optical transceiver 2. The CPU 20 is a one-chip microcontroller, for example. The controller provided in the optical transceiver 2 may be a logic circuit such as an FPGA (field programmable gate array) or a CPLD (complex programmable logic device) or a combination thereof. The optical transceiver 2 according to the embodiment is equipped with a single CPU 20 which executes a repetitive process and an I²C slave process. The repetitive process is a process that is executed repeatedly in the optical transceiver 2 to perform internal controls. The I²C slave process is an interrupt process that is performed in response to, for example, a transmission request according to the I²C communication method. That is, the I²C slave process is executed with priority over the repetitive process. Specific examples of the repetitive process and the I²C slave process will be described later.

The CPU 20 performs, for example, operation controls for outputting a multiplexed optical signal Out and electrical signals RX by running programs (firmware) stored in a built-in internal memory (flash ROM (described later)). A communication that is performed between the host apparatus 90 and the CPU 20 via the communication line L1 is performed according to the I²C communication method. In the I²C communication method, the host apparatus 90 functions as a master and the optical transceiver 2 (CPU 20) functions as a slave. The communication line L1 includes a clock signal line (hereinafter referred to as an "SCL signal line") to be used for transmission of a clock signal from the host apparatus 90 to the CPU 20 performed according to the I²C communication method and a data signal line (hereinafter referred to as an "SDA signal line") to be used for transmission and reception of data between the host apparatus 90 and the CPU 20.

A communication that is performed according to the I²C communication method allows the host apparatus 90 to monitor the operation state of the optical transceiver 2 or perform an operation control for the optical transceiver 2. The frequency of the clock signal may be 400 kHz to 1 MHz, for example. In this specification, the terms "clock signal" and "clock signal frequency" mean a clock signal used in the I²C communication method and the frequency of this clock signal, respectively. In the following description, the clock signal may be referred to as an "SCL signal" and data that is exchanged between the host apparatus 90 and the optical transceiver 2 may be referred to as an "SDA signal."

The optical transceiver 2 is connected to the host apparatus 90 by a communication line L2 for notification of an alarm signal. The communication line L2 is connected to the CPU 20 inside the optical transceiver 2. The alarm signal is a signal indicating that a certain element in the optical transceiver 2 is in an abnormal state.

An internal communication bus L3 for performing a serial communication such as SPI (Serial Peripheral Interface) or I²C communication method with the LDD 6, CDRs 8 and 14, and the TIA 12 is connected to the CPU 20. An internal communication line L4 for transmitting a TxDISABLE signal to the LDD 6 is connected to the CPU 20. An internal communication line L5 for receiving an LOS (loss of signal) signal and an LOL (loss of lock) signal from the CDR 8 is connected to the CPU 20. An internal communication line L6 for receiving an LOS signal from the TIA 12 is connected to the CPU 20. An internal communication line L7 for receiving an LOL signal from the CDR 14 is connected to the CPU 20. In FIG. 1, each of the internal signal lines L1-L7 is one or more signal lines.

The LOS signal is a signal for notification of loss of a signal (e.g., optical signals to be input to the optical transceiver 2). The LOL signal is a signal for notification of a fact that clock recovery of the CDR 8 or 14 is not in a lock state. The TxDISABLE signal is a signal for switching a multiplexed optical signal Oout that is output from the TOSA 4 to an off state or an on state. Switching between the on state and the off state can be made individually for four-channel optical signals.

As shown in FIG. 2, for example, the CPU 20 is equipped with a processor (computation circuit) 22, a flash ROM (read-only memory) 24, a RAM (random access memory) 26, a temperature sensor 28, communication interface circuits 30 and 32, a timer counter 34, an ADC (analog-to-digital converter) 36, external input pins 38, external output pins 40, and an internal bus BUS which connects the above elements so as to enable internal communication between them. In the following, each of the above constituent elements that or with which the processor 22 controls or performs communication via the internal bus BUS will be referred to as a function block.

The processor 22 controls each of the function blocks provided in the CPU 20. Each function block is controlled according to a program (firmware) stored in the flash ROM 24. For example, an 8-bit core or a 32-bit core may be employed as the processor 22 taking into consideration a size that enables installation in the optical transceiver 2, a power consumption that can be used in the optical transceiver 2, and other factors. The clock frequency of the CPU 20 may be about 50 to 90 MHs, for example. The temperature sensor 28 measures a temperature in the CPU 20. The communication interface circuit 30 is an external communication circuit for performing a communication with the host apparatus 90 via the communication line L1, for example. The communication interface circuit 30 includes an interface circuit for performing a communication via the communication line L1 according to the I²C communication method. The communication interface circuit 32 is an internal communication circuit for performing a communication with each element (e.g., LDD 6) in the optical transceiver 2 via the internal communication bus L3, for example.

The timer counter 34 measures an elapsed time from a certain reference time by, for example, counting clocks having a constant cycle in the CPU 20. The ADC 36 receives an analog signal (electrical signal) from each element in the optical transceiver 2 via a connection line (not shown) and convers the received analog signal into a digital signal. For example, a control signal is input from the host apparatus 90 to the external input pins 38 via a communication bus (not shown) provided between the host apparatus 90 and the CPU 20. Furthermore, for example, an LOS signal or an LOL signal is input to the external input pins 38 from the TIA 12 or the CDR 8 or 14 via the internal communication line L5, L6, or L7. For example, the external output pins 40 output an alarm signal to the host apparatus 90 via the communication line L2. Furthermore, for example, the external output pins 40 output a TxDISABLE signal to the LDD 6 via the internal communication line L4.

The flash ROM 24 stores data and programs to be referred to or run by the processor 22. The RAM 26 (memory unit) stores data acquired from each element in the optical transceiver 2 via the ADC 36 and data to be exchanged with the host apparatus 90. The RAM 26 is assigned a register memory map that complies with the QSFP28 MSA standard and data corresponding to these registers are stored in its respective registers.

FIG. 3 shows the register memory map that complies with the QSFP28 MSA standard. Each register is assigned an access right. In the memory map of this type, registers (refer to memory addresses "3-21," "22-23," "26-27," and "34-57") only reading from which is permitted as in the case of an alarm (interrupt flags) or a monitor value, a register (refer to a memory address "127") reading and writing from which are possible, and a register (refer to memory addresses "123-126") only writing to which is permitted as in the case of a password (password entry) exist in mixture. These access rights are checked when data transmission or reception is performed according to the I²C communication method. FIG. 4 shows an example memory map in which the memory map shown in FIG. 3 is assigned to areas (address space) in the RAM 26 included in the CPU 20.

The CPU 20 (processor 22) controls a communication ($I^2C$ communication) that is performed between the optical transceiver 2 and the host apparatus 90 according to the $I^2C$ standard. In this communication, as described above, the host apparatus 90 to serve as a master transmits a prescribed command and data to the optical transceiver 2 (CPU 20) to serve as a slave and the optical transceiver 2 (CPU 20) makes a prescribed response to the command etc. FIG. 5 is a block diagram showing a hardware configuration relating to $I^2C$ communication with the host apparatus 90 in the CPU 20 shown in FIG. 1. For example, the communication interface circuit 30 is equipped with, as a hardware configuration relating to $I^2C$ communication with the host apparatus 90, an $I^2C$ control unit 42, a shift register 44, an address register 46, a status register 48, and a selector 50. The hardware configuration shown in FIG. 5 corresponds to a part, relating to $I^2C$ communication, of the communication interface circuit 30 shown in FIG. 2.

The $I^2C$ control unit 42 operates on the basis of, for example, an operation instruction supplied from the processor 22. The $I^2C$ control unit 42 is connected to the RAM 26 (internal memory) via the internal bus BUS provided in the CPU 20. The $I^2C$ control unit 42 can read and write data from and to the RAM 26 by accessing the RAM 26.

The shift register 44 is a register that is used for transmission and reception of data (SDA signal) performed according to the $I^2C$ communication method. For example, when the CPU 20 receives data from the host apparatus 90, data that is transmitted via the SDA signal line in synchronism with a clock signal (SCL signal) is read into the shift register 44 bit by bit from the head. In this case, the shift register 44 serves as a reception register. When the CPU 20 transmits data to the host apparatus 90, data stored in the shift register 44 is output to the SDA signal line via the selector 50 bit by bit from the head in synchronism with a clock signal. In this case, the shift register 44 serves as a transmission register. The shift register 44 and the $I^2C$ control unit 42 are connected to each other in parallel by an 8-bit signal line, for example. This makes it possible to perform writing and reading of 8-bit data (message) between the shift register 44 and the $I^2C$ control unit 42 mutually by a parallel transmission.

The address register 46 is a register for storing particular address information assigned to each optical transceiver (slave) in the $I^2C$ communication method. When address information (hereinafter referred to as "slave address information") transmitted from the host apparatus 90 and indicating a particular optical transceiver coincides with the address information stored in the address register 46, the optical transceiver 2 recognizes that the message transmitted from the host apparatus 90 is directed to itself. When the optical transceiver 2 recognizes that the message has been transmitted to itself, information indicating an Ack signal (acknowledgment signal) is set in the status register 48. Subsequently, the $I^2C$ control unit 42 transmits the Ack signal to the host apparatus 90 from the status register 48 and then processes (e.g., receives) data transmitted from the host apparatus 90. The $I^2C$ control unit 42 has acquired slave address information (e.g., "1010000xb" shown in FIG. 3) stored at a prescribed address in an internal memory (flash ROM 24 or RAM 26) via the internal bus BUS and stored this slave address information in the address register 46 in advance.

The $I^2C$ control unit 42 controls transmission and reception of data and output of an Ack signal and a Nack signal (non-acknowledge signal) using an SDA control signal. For example, in receiving data from an SDA signal line (at a terminal 52), the $I^2C$ control unit 42 controls the selector 50 so that data in the shift register 44 and status information (control status information) supplied from the status register 48 is not output from to the SDA signal line. The status information is information indicating whether a current state is a state in which an Ack signal should be transmitted or a state in which a Nack signal should be transmitted. In transmitting data to the host apparatus 90 via the SDA signal line (from the terminal 52), the $I^2C$ control unit 42 controls the selector 50 so that data in the shift register 44 is output as an SDA signal, using an SDA control signal. In transmitting an Ack signal or a Nack signal to the host apparatus 90, the $I^2C$ control unit 42 controls the selector 50 so that the status information in the status register 48 is output as an SDA signal.

When necessary, the $I^2C$ control unit 42 sets clock stretching (stretches a clock signal) using an SCL control signal. The clock stretching is a mechanism of the $I^2C$ standard for preventing advancement to the next process by holding transmission or reception of data by the CPU 20 (slave side)'s keeping a clock signal transmitted from the host apparatus 90 (master side) at the low level. For example, the $I^2C$ control unit 42 sets clock stretching by setting the level of an SCL control signal at the low level. The SCL control signal may be output to the SCL signal line (from the terminal 54) via wired AND connection. A clock signal is kept at the low level as a result of the SCL control signal's being set at the low level by the $I^2C$ control unit 42, whereby clock stretching is done. To stop clock stretching (to stop stretching of the clock signal), the $I^2C$ control unit 42 returns the level of SCL control signal from the low level to the high level.

The CPU 20 analyzes a message that is transmitted from the host apparatus 90 to the $I^2C$ control unit 42. In the analysis, it is judged whether data received via the shift register 44 is information relating to a memory address (hereinafter referred to as "memory address information"), reception data from the host apparatus 90, or an instruction relating to a data transmission request from the host apparatus 90. When it is judged that the data received via the shift register 44 is reception data from the host apparatus 90, the data received via the shift register 44 is written to the RAM 26 at an address specified by memory address information via the internal bus BUS. When it is judged that the data received via the shift register 44 is an instruction relating to a data transmission request from the host apparatus 90, the $I^2C$ control unit 42 transfers data to be transmitted to the host apparatus 90 and then controls the selector 50 using an SDA control signal so that the data concerned in the shift register 44 is output to the SDA signal line.

(Repetitive Process)

Figure 6:
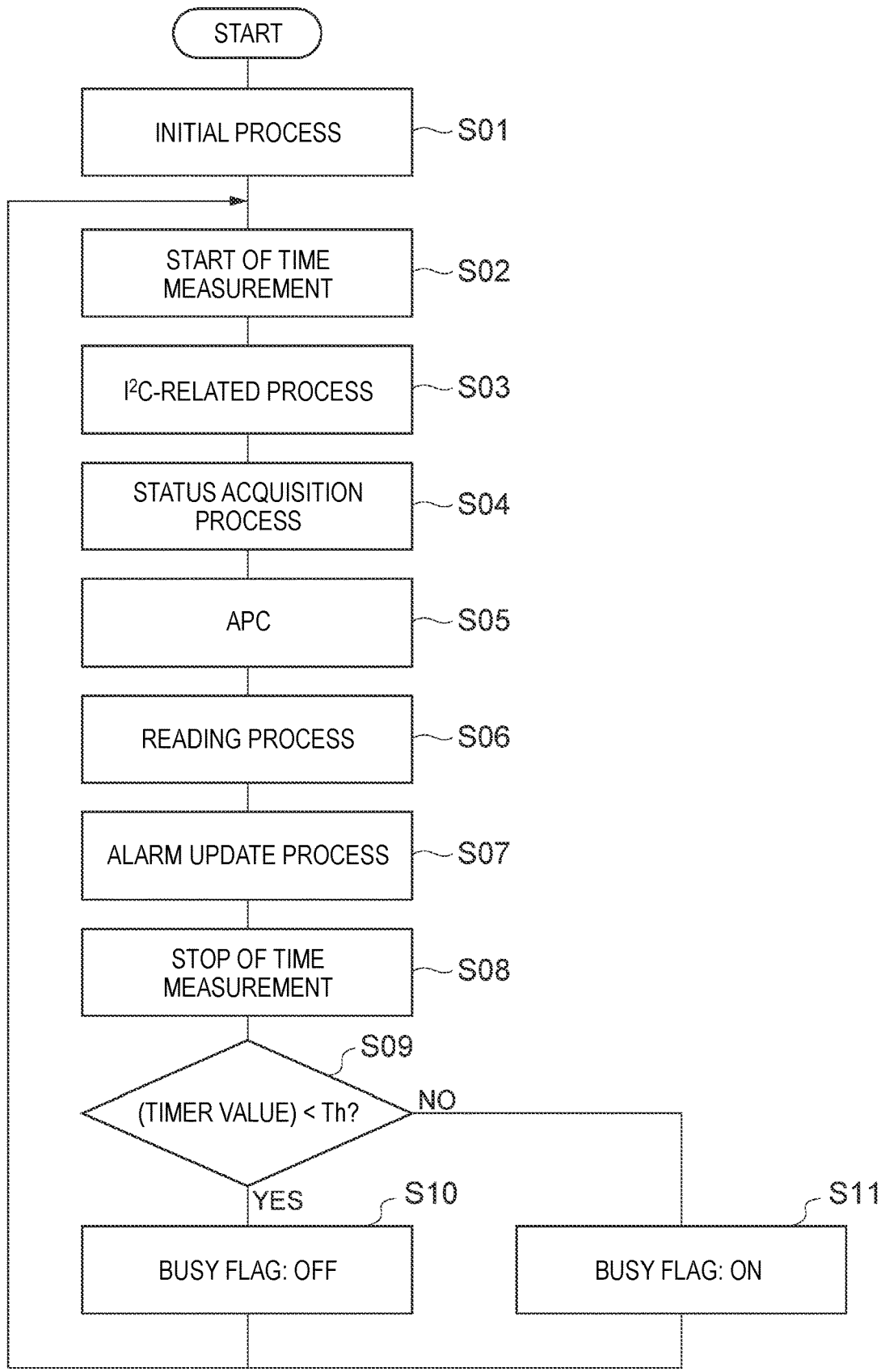
FIG. 6 is a flowchart showing an example repetitive process.

Next, the period process executed by the CPU 20 will be described. FIG. 6 is a flowchart showing an example repetitive process. First, at step S01, the processor 22 of the CPU 20 reads out a prescribed program (firmware) from the flash ROM 24 when the optical transceiver 2 has been rendered in an operation state and executes an initial process according to the program. For example, at step S01, the processor 22 performs initial setting in the CPU 20 and setting of an interrupt port. Step S01 is executed before a start of the repetitive process. The repetitive process that will be described below in detail is also executed according to firmware.

At step S02, the processor 22 starts measuring a processing time (timer count) to measure a processing time of the repetitive process. For example, at step S02, the processor 22 causes the timer counter 34 to measure a processing time. At step S03, the processor 22 executes an I²C-related process. At step S03, since the processor 22 executes a process relating to I²C communication that cannot be executed as an I²C process because it takes long time. For example, the processor 22 executes a process of writing, to the flash ROM 24, data transmitted from the host apparatus 90 according to the I²C communication method.

At step S04, the processor 22 executes a status acquisition process of acquiring operation statuses of respective elements in the optical transceiver 2. For example, the status acquisition process of step S04 includes a process of acquiring measurement values relating to various monitoring items, a process of converting the measurement values into monitoring values, and an alarm (warning) judgment process. In the process of acquiring measurement values relating to various monitoring items, for example, the processor 22 acquires, via the ADC 36, a temperature of the optical transceiver 2 and a measurement value (e.g., voltage value) relating to a power source voltage for driving the optical transceiver 2. Furthermore, the processor 22 acquires, via the ADC 36, measurement values relating to bias modulation currents to flow through the laser diodes in the TOSA 4, an optical power of a multiplexed optical signal Oout that is output from the TOSA 4, and an optical power of a multiplexed optical signal Oin that is input to the ROSA 10.

The measurement values that are obtained in the process of acquiring measurement values relating to the various monitoring items are values corresponding to actual physical quantities. Thus, in the process of converting the measurement values, the processor 22 converts the various measurement values (voltage values) into monitoring values (physical quantity values) on the basis of a correspondence table stored in advance. For example, the processor 22 converts a measurement value (voltage value) relating to an optical power of a multiplexed optical signal Out into an optical power monitoring value (power value). In the alarm judgment process, the processor 22 judges whether the monitoring values obtained by converting the measurement values are abnormal values (or normal values). For example, the processor 22 judges whether each monitoring value acquisition target element is in a normal state or an abnormal state by comparing a monitoring value with a predetermined threshold value. For example, the processor 22 stores, at prescribed addresses in the RAM 26, information relating to the monitoring values etc. acquired by executing step S04.

At step S05, the processor 22 executes an APC (automatic power control). At step S05, the processor 22 adjusts the setting values of bias modulation currents to flow through the laser diodes in the TOSA 4 so that the optical power of a multiplexed optical signal Out becomes constant. For example, the processor 22 adjusts the setting values of the bias modulation currents by comparing monitoring values relating to the optical power of a multiplexed optical signal Out with a target value. The acquisition of a monitoring value and the comparison between the acquired monitoring value and a target value may be performed for each of 4-channel optical signals.

At step S06, the processor 22 executes a reading process for acquiring LOS/LOL signals from the TIA 12 and the CDRs 8 and 14. At step S06, for example, the processor 22 acquires information relating to LOS/LOL signals via the external input pins 38.

At step S07, the processor 22 executes a process for updating alarm information for each element in the optical transceiver 2. At step S07, for example, the processor 22 stores, at prescribed addresses in the RAM 26, judgment result information of step S04 indicating each element in the optical transceiver 2 is in an abnormal state or a normal state. Furthermore, the processor 22 stores the information relating to the LOS/LOL signals acquired from the TIA 12 and the CDRs 8 and 14 at prescribed addresses. As a result, the pieces of alarm information stored in the RAM 26 are updated. Furthermore, when one element in the optical transceiver 2 is in an abnormal state, the processor 22 outputs an alarm information indicating that this element is in an abnormal state to the host apparatus 90 via an external output pin 40 and the communication line L2.

At step S08, the processor 22 stops the processing time measurement (timer count measurement). At step S08, for example, the processor 22 stops the counting of the timer counter 34 and acquires, as a timer value, a time from the start to the stop of the processing time measurement. This timer value indicates a processing time that is taken to execute one cycle of steps S03-S07 (repetitive process) (hereinafter referred to simply as a "processing time of the repetitive process"). The processor 22 may reset the processing time count of the timer counter 34 after acquiring the timer value at step S08. The "processing time of the repetitive process" may include not only a time in which the processor 22 actually executes steps S03 to S07 (i.e., a time in which processes are executed) but also a time in which one of steps S03 to S07 is suspended temporarily by an interrupt process such as an I²C slave process. In other words, the processing time (timer value) of a repetitive process varies depending on the frequency of interrupt processes and times taken by the interrupt processes.

At step S09, the processor 22 judges whether the timer value acquired at step S08 is smaller than a predetermined threshold value Th (prescribed value). When it is judged that the timer value is smaller than the threshold value Th (S09: yes), which means that the repetitive process was executed without stagnation, the processor 22 sets a busy flag to off at step S10. When it is judged that the timer value is larger than or equal to the threshold value Th (S09: no), in which case it is highly probable that stagnation occurred in the repetitive process, the processor 22 sets the busy flag to on at step S11. The processor 22 may store information relating to setting of the busy flag (setting of a processing mode) in the RAM 26. When the busy flag is set to off, the processing mode of an I²C slave process is set to a first processing mode. On the other hand, when the busy flag is set to on, the processing mode of an I²C slave process is set to a second processing mode. The first processing mode and the second processing mode will be described later.

After the completion of execution of steps S10 or S11, the processor 22 executes steps S02 to S11 again. As a result, the repetitive process of steps S03 to S07 is executed again. The processing time of the repetitive process itself from steps S03 to S07 (excluding a waiting time due to interrupt processes) is about 5 ms, for example. In this case, the threshold value Th may be set at 10 ms. When steps S02 to S11 are executed again, a time to execute steps S02 and S08 to S11 is necessary in addition to the above-mentioned processing time of the repetitive process. However, since steps S02 and S08 to S11 are relatively simple operations or processes, a time to execute those steps is much shorter than the processing time of the repetitive process and hence is negligible. The time necessary to execute steps S02 and S08 to S11 is about several microseconds to several tens of microseconds, for example. That is, the time necessary to execute steps S02 to S11 can be considered to be approximately equal to the processing time of the repetitive process. In other words, in the embodiment of the disclosure, the processes (steps S02 and S08 to S11) that are executed in addition to the repetitive process have no substantial influence on the processing time of the repetitive process.

As described above, the repetitive process (steps S03 to S07) executed by the processor 22 includes the process (step S04) of controlling the operations of the laser diodes and the photodiodes and the process (step S07) of updating the data stored in the RAM 26 according to results obtained at step S04. The process of controlling the operations of the laser diodes (or photodiodes) includes acquisition of monitor values of the bias modulation currents etc. for controlling the laser diodes (or photodiodes).

Incidentally, the repetitive process executed by the processor 22 repetitively is not limited to the series of processes shown in FIG. 6. For example, the repetitive process executed by the processor 22 need not always include all of the processes shown in FIG. 6. For example, the repetitive process executed by the processor 22 need not always include the I²C-related process (step S03). The content of the repetitive process may vary from one cycle to another, and part of the repetitive process may be omitted in a certain cycle. The repetitive process executed by the processor 22 may include a process other than the processes shown in FIG. 6. Furthermore, in the repetitive process exemplified in FIG. 6, the positions of certain steps in the execution order may be switched.

(I²C Slave Process)

Next, the I²C slave process to be executed by the CPU 20 will be described. The following description will be directed to a case that data is transmitted from the optical transceiver 2 (CPU 20) to the host apparatus 90 according to the I²C communication method. Data to be transmitted from the optical transceiver 2 to the host apparatus 90 includes monitoring data of plural bits (in this example, 8 bits). The host apparatus 90 controls the optical transceiver 2 according to the content of the monitoring data. That is, the monitoring data is data that is used for the purpose of control of the optical transceiver 2 by the host apparatus 90. The optical transceiver 2 is requested by the host apparatus 90 to transmit information in each register assigned in the memory map shown in FIG. 3 via a communication performed according to the I²C communication method, and the optical transceiver 2 is required to return internal data in the optical transceiver 2 properly within a time of prescribed timing.

Figure 7:
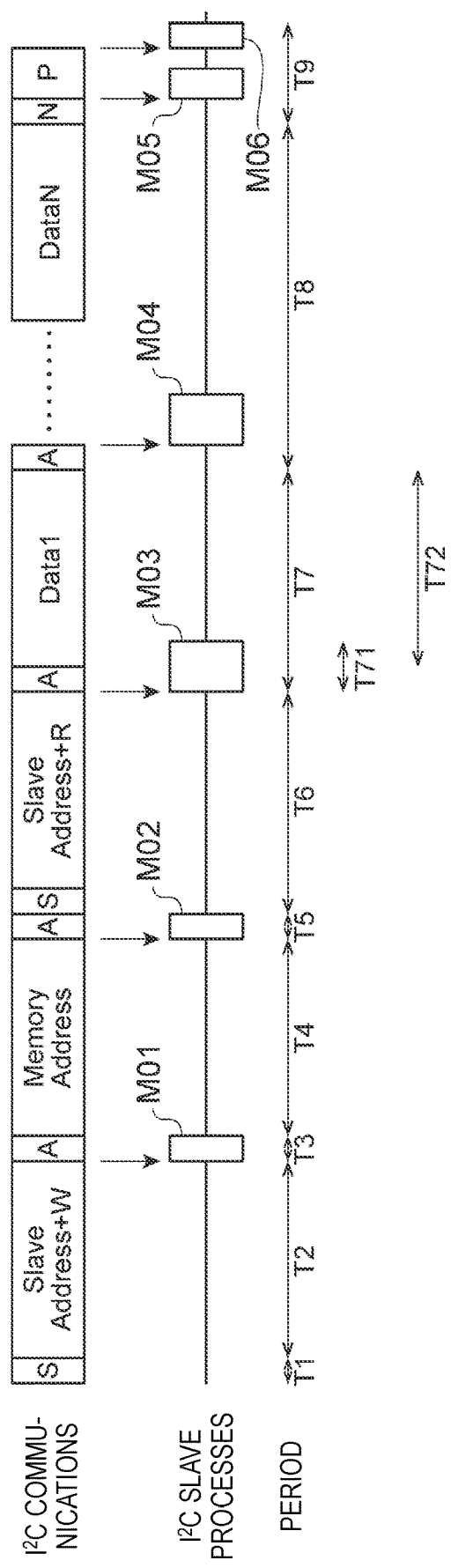
FIG. 7 is a diagram for description of timings of I²C slave processes executed by the processor.
Figure 8:
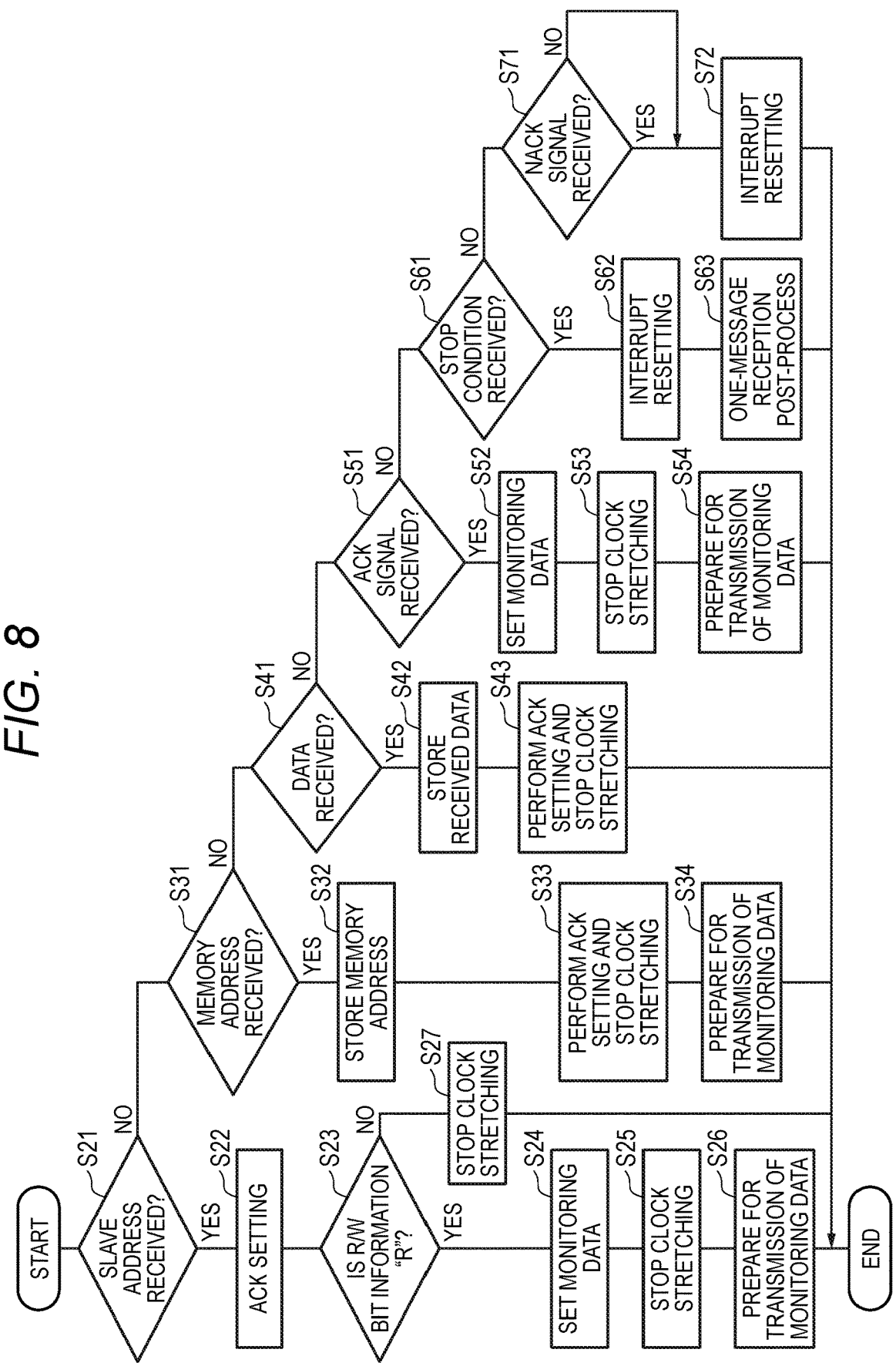
FIG. 8 is a flowchart of I²C slave processes executed by the processor.
Figure 9:
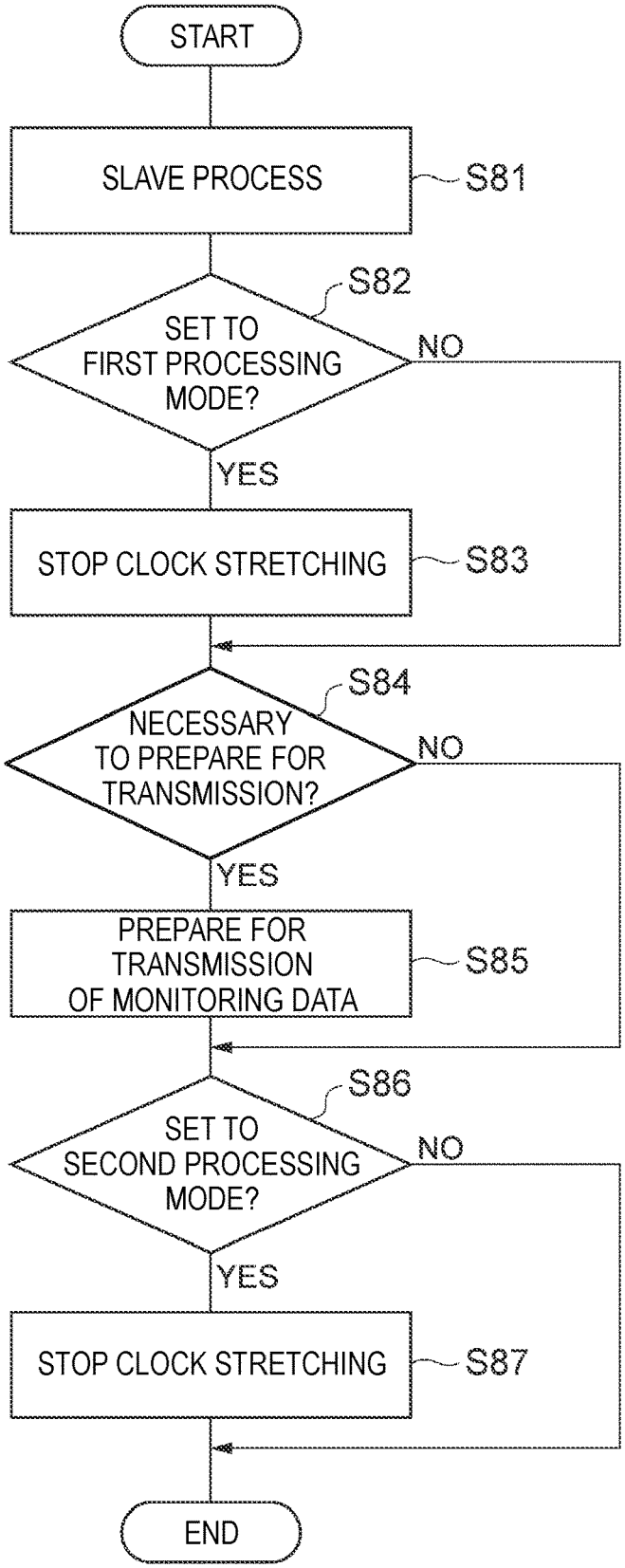
FIG. 9 is a flowchart of an I²C slave process that is executed in such a manner as to be suitable for the length of a repetitive process.

FIG. 7 is a diagram for description of timings of I²C slave processes executed by the processor 22. FIG. 8 is a flowchart of I²C slave processes executed by the processor 22. FIG. 9 is a flowchart of an I²C slave process that is executed in such a manner as to be suitable for the length of a repetitive process.

First, a process of a series of data transmissions between the optical transceiver 2 and the host apparatus 90 will be described using, as an example, a case that N (N: an integer that is larger than or equal to 2) monitoring data Data1 to DataN are transmitted from the optical transceiver 2 to the host apparatus 90. "I²C communications" in the top part of FIG. 7 show the details of communications that are performed between the host apparatus 90 and the optical transceiver 2. "I²C slave processes" in the bottom part of FIG. 7 show execution timings of I²C slave processes executed by the processor 22 according to the details of the communications shown in the top part.

As shown in FIG. 7, first, in a period T1, the host apparatus 90 generates a start condition S that is a condition for a start of data transmissions between the host apparatus 90 and the optical transceiver 2. In the period T1, the host apparatus 90 generates a start condition S by changing an SDA signal (clock signal) from the high level to the low level while an SCL signal (clock signal) is at the high level. In a period T2, the host apparatus 90 transmits slave address information (e.g., 7-bit slave address) for identifying an optical transceiver as a communication destination and 1-bit information (hereinafter referred to as "R/W bit information") indicating a transmission direction of information to be transmitted next (in this example, memory address information). In this example, since the transmission direction of information to be transmitted next is "from the host apparatus 90 to the optical transceiver 2," the R/W bit information is set at a bit value (e.g., low level) indicating "Write."

In a period T3, the processor 22 of the optical transceiver 2 executes an I²C slave process M01. In the I²C slave process M01, first, the processor 22 sets clock stretching. Then the processor 22 compares the slave address information transmitted from the host apparatus 90 with slave address information assigned to itself (i.e., slave address information stored in the address register 46). When the two pieces of slave address information coincide with each other, the processor 22 sets information indicating an Ack signal in the status register 48 as acknowledgment information and causes the I²C control unit 42 to transmit the Ack signal to the host apparatus 90. At this time, the processor 22 stops the clock stretching. In the following description, a process of setting information indicating an Ack signal in the status register 48 will be referred to as an "Ack setting process." Setting and stopping of clock stretching is done by the processor 22's controlling the I²C control unit 42.

In a period T4, the host apparatus 90 transmits memory address information indicating addresses of a data storage area in the RAM 26 to the optical transceiver 2. In a period T5, the processor 22 executes an I²C slave process M02. In the I²C slave process M02, first, the processor 22 sets clock stretching. Then the processor 22 stores the memory address information transmitted from the host apparatus 90. Then the processor 22 executes an Ack setting process. At this time, the processor 22 stops the clock stretching.

In the I²C slave process M02, the processor 22 prepares monitoring data (Data1) of plural bits (e.g., 8 bits) included in the data in the addresses indicated by the memory address information transmitted from the host apparatus 90. More specifically, predicting that a process of transmitting data from the optical transceiver 2 to the host apparatus 90 will be executed on the basis of the memory address information transmitted from the host apparatus 90, the processor 22 reads out, from the RAM 26, the monitoring data Data1 that is scheduled to be transmitted first and stores it in a register (e.g., a data register in the I²C control unit 42) that is different from the shift register 44. The processor 22 stops the clock stretching before or after the preparation of the monitoring data Data1.

In a period T6, first, the host apparatus 90 generates a start condition S. After the generation of the start condition S, the host apparatus 90 transmits slave address information for identifying the optical transceiver 2 (communication destination) and R/W bit information indicating a transmission direction of information (in this example, monitoring data Data1) to be transmitted next. In this example, since the transmission direction of information to be transmitted next is "from the optical transceiver 2 to the host apparatus 90," the R/W bit information is set at a bit value (e.g., high level) indicating "Read."

In a period T71 of the period T7, the processor 22 executes an I²C slave process M03. In the I²C slave process M03, the processor 22 set clock stretching. In the I²C slave process M03, first, the processor 22 sets clock stretching. Then the processor 22 compares the slave address information transmitted from the host apparatus 90 with the slave address information assigned to itself. The processor 22 executes an Ack setting process when the two pieces of address information coincide with each other. Since the R/W bit information is set at the bit value indicating "Read," the processor 22 causes the I²C control unit 42 to set the monitoring data Data1 in the shift register 44.

Furthermore, the processor 22 prepares monitoring data Data2 to be transmitted next to the monitoring data Data1. For example, the processor 22 reads this monitoring data from the RAM 26 and stores it in a register (e.g., a data register in the I²C control unit 42) that is different from the shift register 44. The processor 22 stops the clock stretching before or after the preparation of the monitoring data Data2. The stopping of the clock stretching causes a start of transmission of the monitoring data Data1 that is set in the shift register 44 to the host apparatus 90.

In a period T72 of the period T7, the monitoring data Data1 stored in the shift register 44 is transmitted to the host apparatus 90 bit by bit. The period T72 is started by the stopping of the clock stretching in the period T71. The processor 22 can execute other processes including the above repetitive process during the transmission of the monitoring data Data1.

In the period T8, the host apparatus 90 transmits an Ack signal to the optical transceiver 2 after receiving the monitoring data Data1. The processor 22 executes an I²C slave process M04 upon receiving the Ack signal from the host apparatus 90. In the I²C slave process M04, the processor 22 causes the I²C control unit 42 to set, in the shift register 44, the monitoring data Data2 that it read out from the RAM 26 in advance. Furthermore, the processor 22 prepares monitoring data Data3 that is scheduled to be transmitted next to the monitoring data Data2. The processor 22 stops the clock stretching before or after the preparation of the monitoring data Data3. The stopping of the clock stretching causes a start of transmission of the monitoring data Data2 that is set in the shift register 44 to the host apparatus 90. Subsequently, in a period T8, the processor 22 repeats setting of monitoring data in the shift register 44 and preparation of the next monitoring data (i.e., reading from the RAM 26) according to the same procedure as described above.

After the transmission of the last monitoring data DataN, in a period T9, the host apparatus 90 transmits a Nack signal to the optical transceiver 2 as transmission end information. Then the host apparatus 90 generates a stop condition P indicating completion of the series of transmission and reception processes. The processor 22 executes an I²C slave process M05 upon receiving the Nack signal from the host apparatus 90, and executes an I²C slave process M06 upon the generation of the stop condition P. In the I²C slave processes M05 and M06, the processor 22 performs interrupt resetting and executes a one-message reception post-process. The host apparatus 90 generates a stop condition P by changing an SDA signal from the low level to the high level while an SCL signal is at the high level. This completes the series of data transmission processes. The processor 22 executes the above-described repetitive process in the periods when none of the I²C slave processes M01 to M06 is executed.

FIG. 8 is a flowchart showing example I²C slave processes to be performed by the processor 22. FIG. 8 shows I²C slave processes to be executed in a state that the processing mode is set at the first processing mode. The timing of stopping of clock stretching may be different when the processing mode is set to the second processing mode. The series of processes shown in FIG. 8 is started by reception of information relating to an I²C communication transmitted from the host apparatus 90. First, the processor 22 sets clock stretching upon receiving information (hereinafter referred to as "transmission information") transmitted from the host apparatus 90.

After setting clock stretching, at step S21 the processor 22 judges whether the transmission information is slave address information. When having judged that the transmission information is slave address information (S21: yes), the processor 22 executes steps S22 to S26 or steps S22, S23, and S27 in order. Steps S22, S23, and S27 correspond to the I²C slave process M01. Steps S22 to S26 correspond to the I²C slave process M03. At step S22, the processor 22 executes an Ack setting process. At step S23, the processor 22 judges whether R/W bit information is at the high level.

When the R/W bit information is at the high level (Read) (S23: yes), the processor 22 executes steps S24 to S26 in order. At step S24, the processor 22 causes the I²C control unit 42 to set first monitoring data (Data1) in the shift register 44. At step S25, the processor 22 stops the clock stretching, whereupon transmission of the monitoring data (Data1) that was set in the shift register 44 at step S24 to the host apparatus 90 is started. At step S26, the processor 22 prepares for transmission of monitoring data (Data2) by reading it out from the RAM 26. When the R/W bit information is at the low level (Write) (S23: no), the processor 22 executes step S27. At step S27, the processor 22 stops the clock stretching. The order of execution of steps S25 and S26 when the R/W bit information is at the high level varies depending on the processing mode. Here the processor 22 finishes the I²C slave process in the case of the transmission information being slave address information.

When having judged that the transmission information is not slave address information (S21: no), at step S31 the processor 22 judges whether the transmission information is memory address information. When having judged that the transmission information is memory address information (S31: yes), the processor 22 executes steps S32-S34 in order. Steps S32-S34 correspond to the I²C slave process M02. At step S32, the processor 22 stores the memory address information in an internal memory (e.g., RAM 26). At step S33, the processor 22 executes an Ack setting process and stops the clock stretching. At step S34, the processor 22 prepares for transmission of monitoring data (Data1) to be transmitted first by reading it out from the RAM 26. The stopping of the clock stretching may be done after step S34 (this timing depends on the processing mode). Here the processor 22 finishes the I²C slave process in the case of the transmission information being memory address information.

When having judged that the transmission information is not memory address information (S31: no), at step S41 the processor 22 judges whether the transmission information is data transmitted from the host apparatus 90. When having judged that the transmission information is data transmitted from the host apparatus 90 (S41: yes), the processor 22 executes steps S42 and S43 in order. At step S42, the processor 22 stores the received data in an internal memory (e.g., RAM 26). At step S43, the processor 22 executes a process that is similar to the process of step S33. Here the processor 22 finishes the I²C slave process in the case of the transmission information being data transmitted from the host apparatus 90.

When having judged that the transmission information is not data transmitted from the host apparatus 90 (S41: no), at step S51 the processor 22 judges whether the transmission data is an Ack signal from the host apparatus 90. When having judged that the transmission information is an Ack signal (S51: yes), the processor 22 executes steps S52 to S54 in order. Steps S52 to S54 correspond to the I²C slave process M04. At step S52, the processor 22 causes the I²C control unit 42 to set (i.e., store temporarily), in the shift register 44, monitoring data that was prepared in advance.

At step S53, the processor stops the clock stretching, whereupon transmission of the monitoring data that was set in the shift register 44 at step S52 to the host apparatus 90 is started. At step S54, the processor 22 prepares for transmission of next monitoring data by reading it out from the RAM 26. For example, the processor 22 stores, temporarily, next monitoring data read out from the RAM 26 in a data register of the I²C control unit 42. The order of execution of steps S53 and S54 varies depending on the processing mode. Here the processor 22 finishes the I²C slave process in the case of the transmission information being an Ack signal transmitted from the host apparatus 90.

When having judged that the transmission information is not an Ack signal transmitted from the host apparatus 90 (S51: no), at step S61 the processor 22 judges whether the transmission information is a stop condition P that was generated by the host apparatus 90. When having judged that the transmission information is a stop condition P (S61: yes), the processor 22 executes steps S62 and S63 in order. Steps S62 and S63 correspond to the I²C slave process M06. At steps S62 and S63, the processor 22 performs interrupt resetting and executes a one-message reception post-process, respectively. Here the processor 22 finishes the I²C slave process in the case of the transmission information being a stop condition P.

When having judged that the transmission information is not a stop condition P (S61: no), at step S71 the processor 22 judges whether the transmission information is a Nack signal. In the example shown in FIG. 8, the processor 22 executes step S72 which is similar to step S62 irrespective of whether the transmission information is a Nack signal. Step S72 corresponds to the I²C slave process M05. Here the processor 22 finishes the I²C slave process in the case of the transmission information being a Nack signal.

Although omitted in the flowchart of FIG. 8, the processor 22 changes the timing of stopping of clock stretching depending on the processing mode that is set according to the processing time of a repetitive process. FIG. 9 is a flowchart showing an example I²C slave process in which the timing of stopping of clock stretching varies depending on the processing mode. In the flowchart of FIG. 9, part of the process shown in the flowchart of FIG. 8 is expressed in a simplified manner. The processor 22 sets clock stretching when receiving transmission information transmitted from the host apparatus 90.

After setting clock stretching, at step S81 the processor 22 executes a slave process commensurate with transmission information transmitted from the host apparatus 90. The slave process executed at step S81 is part of an I²C slave process and its content varies depending on the transmission information. When the transmission information is slave address information, step S81 corresponds to step S22 (Ack setting process). When the transmission information is memory address information, step S81 corresponds to part of step S33 (Ack setting process) and step S32. When the transmission information is data transmitted from the host apparatus 90, step S81 corresponds to part of step S43 (Ack setting process) and step S42. When the transmission information is an Ack signal transmitted from the host apparatus 90, step S81 corresponds to step S52.

At step S82, the processor 22 judges whether the processing mode of the I²C slave process is set to the first processing mode. Where the processing mode of the I²C slave process is set to the first processing mode (S82: yes), the processor 22 stops clock stretching at step S83. On the other hand, where the processing mode of the I²C slave process is not set to the first processing mode (S82: no), the processor 22 does not execute step S83. In other words, the processor 22 does not execute step S83 in the case where the processing mode is set to the second processing mode.

At step S84, the processor 22 judges whether it is necessary to prepare for transmission of monitoring data that is scheduled to be transmitted next. For example, when the processor 22 receives an Ack signal from the host apparatus 90 after a start of transmission of monitoring data (see step S51 in FIG. 8), the host apparatus 90 judges that it is necessary to prepare for transmission of next monitoring data. When having judged that it is necessary to prepare for transmission of monitoring data (S84: yes), at step S85 the processor 22 prepares for transmission of monitoring data that is scheduled to be transmitted next by reading it from the RAM 26. When having judged that it is not necessary to prepare for transmission of monitoring data (S84: no), the processor 22 does not execute step S85.

At step S86, the processor 22 judges whether the processing mode of the I²C slave process is set to the second processing mode. Where the processing mode of the I²C slave process is set to the second processing mode (S86: yes), the processor 22 stops clock stretching at step S87. On the other hand, where the processing mode of the I²C slave process is not set to the second processing mode (S86: no), the processor 22 does not execute step S87. In other words, the processor 22 does not execute step S87 in the case where the processing mode is set to the first processing mode. Where the processing mode is set to the first processing mode, clock stretching has already been stopped because of execution of step S83. Here the processor 22 finishes the I²C slave process.

As described above, in the I²C slave process for transmission of next monitoring data, the timing of stopping of clock stretching varies depending on whether the processing mode is set to the first processing mode or the second processing mode. Where the processing mode is set to the first processing mode in such an I²C slave process for transmission of monitoring data, the processor 22 stores monitoring data (first data) in the shift register 44 and stops stretching of a clock signal (steps S81 and S83) and then reads out, from the RAM 26, monitoring data (second data) to be transmitted next to the first data (step S85). Where the processing mode is set to the second processing mode, the processor 22 stores first data in the shift register 44 and reads out second data from the RAM 26 (steps S81 and S85) and then stops stretching of a clock signal (step S87).

Where the processing mode is set to the first processing mode, since clock stretching is stopped before preparation of monitoring data, the processing time from a start of interrupt to the stopping of the clock stretching is about 1 μs, for example. Where the processing mode is set to the second processing mode, since clock stretching is stopped after preparation of monitoring data, the processing time from a start of interrupt to the stopping of the clock stretching is about 20 µs, for example. These processing times depend on the processing ability of the CPU 20 (processor 22) and the operation clock.

Advantages of Embodiment

As described above, in the optical transceiver 2 and the control method of the optical transceiver 2 according to the embodiment, in the case where the processing mode of an I²C slave process is set to the first processing mode, next monitoring data is read out from the RAM 26 after stopping of stretching of a clock signal. Once the stretching of the clock signal is stopped, monitoring data stored in the shift register 44 is transmitted to the host apparatus 90. Thus, in the first processing mode, an I²C slave process including reading-out of next monitoring data is executed while the monitoring data is being transmitted to the host apparatus 90. A repetitive process is executed after the execution of the I²C slave process and before a start of the next interrupt process. A sufficient time to execute the repetitive process may not be secured in the case where the execution of the I²C slave process takes long time.

On the other hand, where the processing mode of an I²C slave process is set to the second processing mode, stretching of a clock signal is stopped after reading-out of next monitoring data from the RAM 26. That is, in the second processing mode, monitoring data stored in the shift register 44 is transmitted to the host apparatus 90 after completion of an I²C slave process including reading-out of the next monitoring data. As a result, where the processing mode of an I²C slave process is set to the second processing mode, a repetitive process can be executed while the monitoring data is being transmitted to the host apparatus 90 after completion of the I²C slave process. A time necessary to execute the repetitive processing can be secured reliably.

Where the processing time of a repetitive process is longer than the threshold value Th, a repetitive process is considered to be in stagnation due to an I²C slave process. In the above-described configuration, a time necessary to execute the repetitive processing can be secured even in the case where the above processing time of a repetitive process is longer than the threshold value Th because in this case the processing mode is set to the second processing mode. As a result, the repetitive process can be executed properly while monitoring data are transmitted to the higher-level host apparatus 90.

Figure 10:
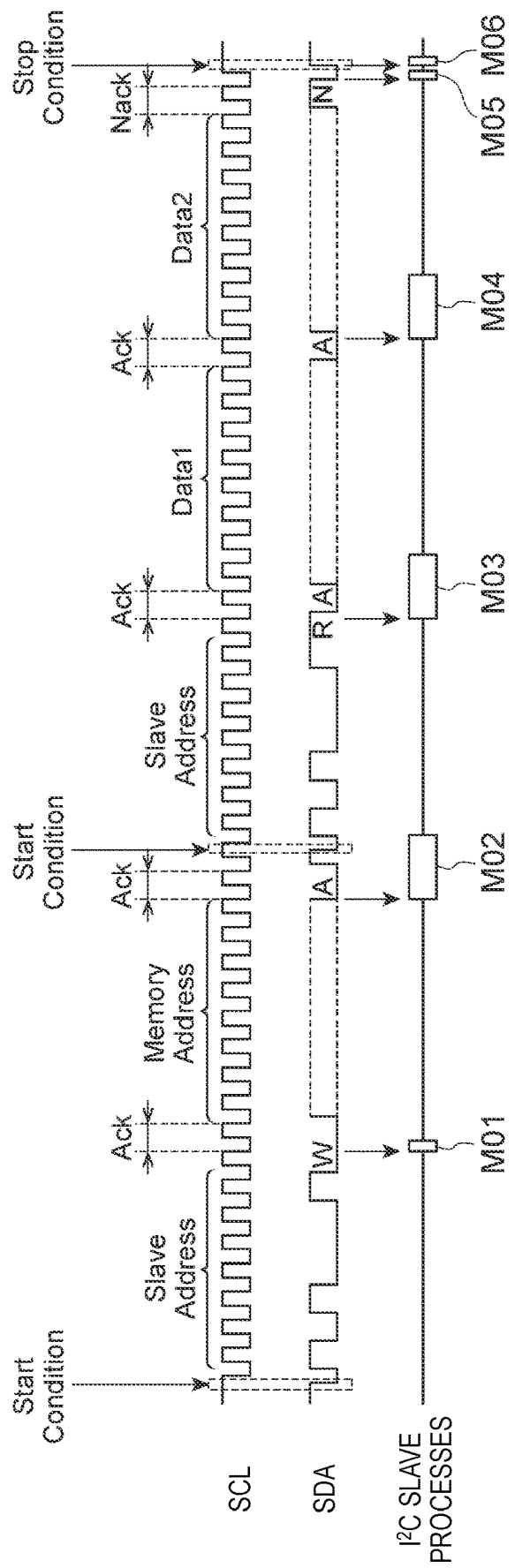
FIG. 10 is a timing chart for description of relationships between I²C communications and I²C slave processes.
Figure 11:
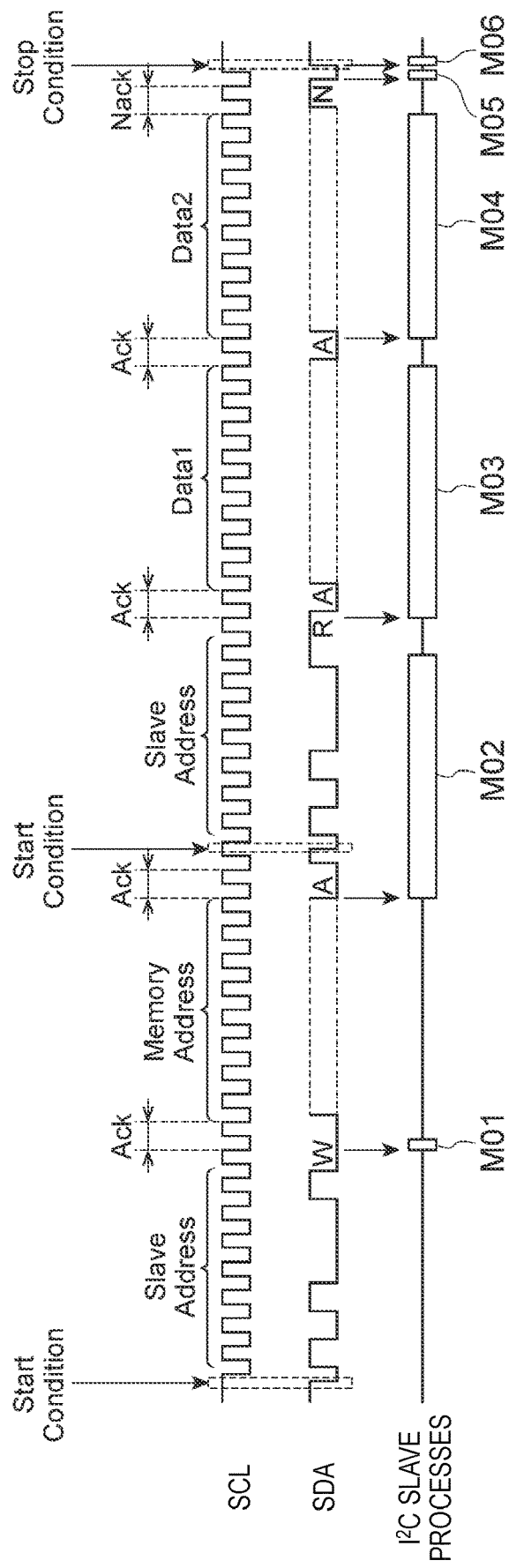
FIG. 11 is another timing chart for description of relationships between I²C communications and I²C slave processes.
Figure 12:
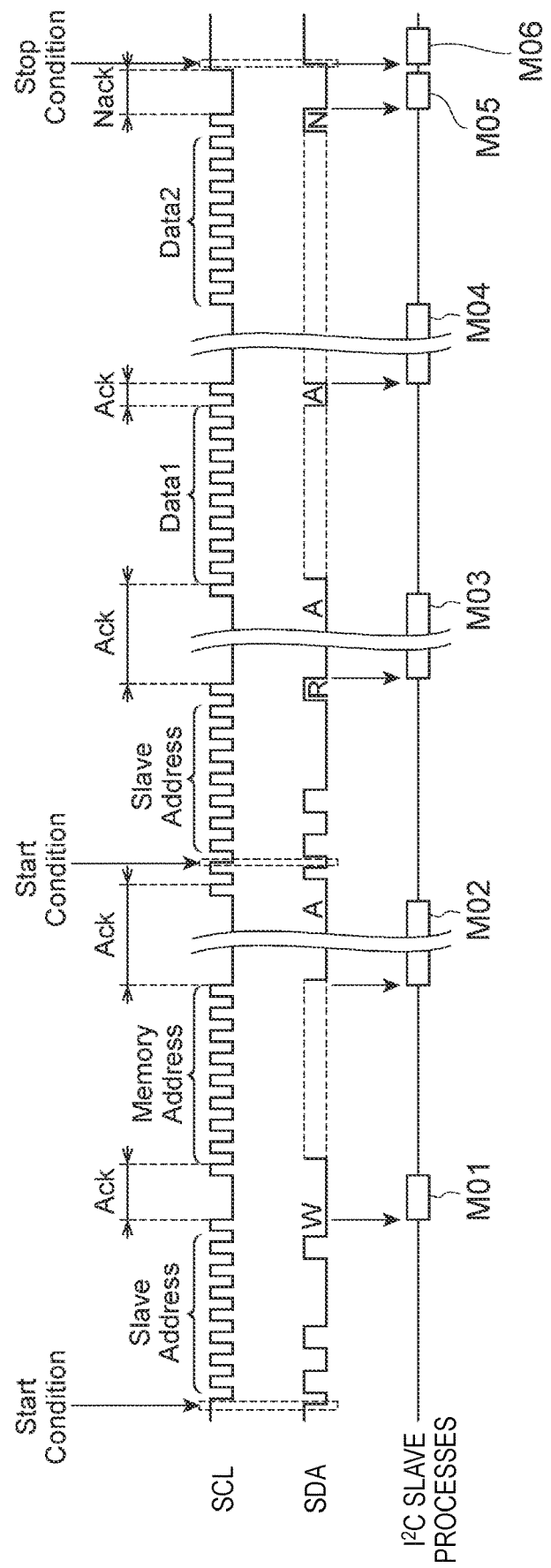
FIG. 12 is a further timing chart for description of relationships between I²C communications and I²C slave processes.

Workings and advantages of the embodiment will now be described in detail with reference to FIGS. 10-12. Each of FIGS. 10-12 is a timing chart for description of relationships between I²C communications and I²C slave processes. FIG. 10 shows I²C slave processes as a first comparative example in which the frequency of a clock signal is set at 100 kHz (standard mode) and the processing mode is set to the first processing mode irrespective of the processing time of a repetitive process. FIG. 11 shows I²C slave processes as a second comparative example in which the frequency of a clock signal is set at 400 kHz (fast mode) and the processing mode is set to the first processing mode irrespective of the processing time of a repetitive process. FIG. 12 shows I²C slave processes according to the embodiment in which the frequency of a clock signal is set at 1 MHz (fast mode plus) and the processing mode is changed according to the processing time of a repetitive process.

In the timing chart of the first comparative example, the time per clock of the clock signal is 10 µs and the time during which the low level continues (hereinafter referred to as a "time t1") in one clock is 4.7 µs. Thus, where an I²C slave process is executed (e.g., I²C slave process M01) in which no preparation for transmission of monitoring data is performed, since the process is completed within the time t1 (i.e., within 1 µs), no waveform corresponding to setting of clock stretching is observed and it does not seem that waiting of the host apparatus 90 occurs.

Incidentally, in transmitting monitoring data to the host apparatus 90, it is necessary to prepare target monitoring data according to a slave address, a memory address, and a specified page number. Where one I²C slave process covers operations from preparation of monitoring data to a start of its transmission, all of this process cannot be completed before stopping of clock stretching (i.e., within the time t1). Thus, monitoring data is prepared after stopping of clock stretching in an I²C slave process (e.g., I²C slave process M02) that precedes the I²C slave process concerned (e.g., I²C slave process M03).

The I²C slave process of the first comparative example includes a first process of taking in a necessary address or data and status and stopping clock stretching and a second process of preparing next data on the basis of data etc. taken in after executing the first process. Where the first process is executed within the time t1 and the second process is executed before arrival of the next I²C slave process (within 10 µs×8=80 µs), this means that the I²C slave process has been executed (e.g., a response has been made in response to an action of the host apparatus 90) without observation of a waveform of setting of clock stretching. Where a time taken from a start of the first process to completion of the second process is about 20 µs, a spare time from completion of one I²C slave process to a start of the next I²C slave process is about 60 µs. In this calculation, for convenience of description, a one-bit period in which an Ack signal is transmitted is not taken into consideration.

The communication rate of the I²C communication method in the QSFP28 form factor is 400 kHz at the maximum. In QSFP-DD (double density), OSFP (Octal Small Form Factor Pluggable), or like standards, a rate of 1 MHz or higher at the maximum is required as a communication rate of the I²C communication method in optical transceivers that realize optical communication of 400 Gbps. Where the frequency of a clock signal is 400 kHz or 1 MHz, the time per clock is equal to 2.5 µs or 1 µs which is shorter than in the first comparative example. Likewise, the time t1 is equal to 1.3 µs or 0.5 µs which is shorter than in the first comparative example. Thus, the time from completion of the first process to a start of the next I²C slave process is equal to 2.5 µs×8=20 µs or 1 µs×8=8 (one bit of an Ack signal is excluded). As a result, as shown in FIG. 11, processes to be executed by the processor 22 are occupied by I²C slave processes (interrupt processes). That is, if the same process as in the first comparative example is employed as it is in the case where the frequency of a clock signal is 400 kHz or 1 MHz, a repetitive process stagnates and may not be executed properly. That is, where a repetitive process is executed while monitoring data are transmitted to the host apparatus 90 using the communication method disclosed in WO 2006/090473, the repetitive process may stagnate depending on the communication rate (frequency of a clock signal) in the I²C communication method.

The probability of occurrence of stagnation of a repetitive process will be described further using specific numerical values for comparison. Table 1 shows the number of data that are transmitted from the optical transceiver 2 to the host apparatus 90 per 10 ms and a time (communication time) taken by this communication. A description will be made with assumptions that a repetitive process shown in FIG. 6 is executed every 10 ms and each repetitive process itself takes 5 ms. Where an interrupt process is completed within 5 ms, the remaining time is made a spare time.

TABLE 1

| | Frequency | | |
|---|---|---|---|
| | 100 kHz | 400 kHz | 1 MHz |
| 1 clock (μs) | 10 | 2.5 | 1 |
| 8 clocks (μs) | 80 | 20 | 8 |
| Number of data (bytes) | 100 | 400 | 1,000 |
| Communication time (μs) | 8,240 | 8,060 | 8,024 |
| Interrupt time (μs) | 2,000 | 8,000 | 20,000 |

Where the frequency of a clock signal is 100 kHz, a one-clock time is 10 μs and a time of 8 bits which is a unit of transmission of monitoring data is 80 μs. Assuming that the number of data transmitted from the optical transceiver 2 to the host apparatus 90 (hereinafter referred simply as "data number") is 100 bytes and transmission of a slave address, a memory map, etc. increases the data number by 3 bytes, the communication time becomes 103×80 μs=8,240 μs in the case where clock stretching is not set. Assuming that one interrupt process takes 20 μs, the processing time (interrupt time) of an I²C slave process of 100 bytes in this communication time becomes 100×20 μs=2,000 μs. That is, since the processing time of a repetitive process is 5 ms and interrupt processes take 2 ms, the processing time of the processor 22 in one cycle (10 ms) is equal to 7 ms in total. The remaining 3 ms is a spare time.

Where the frequency of a clock signal is 400 kHz, a similar calculation with an assumption that data whose data number is 400 bytes which is four times the above number of the case of 100 kHz are transmitted in 10 ms produces a communication time 8,060 μs in the case where no clock stretching is set. In this case, since the processing time of a repetitive process is 5 ms and interrupt processes take about 8 ms, the time of processes the processor 22 needs to execute in one cycle is equal to 13 ms in total. Thus, the processing time of the processor 22 in one cycle exceeds the assumed time 10 ms by about 3 ms.

Where the frequency of a clock signal is 1 MHz, a similar calculation with an assumption that data whose data number is 1,000 bytes which is 10 times the above number of the case of 100 kHz are transmitted in 10 ms produces a communication time 8,024 μs in the case where no clock stretching is set. In this case, since the processing time of a repetitive process is 5 ms and interrupt processes take about 20 ms, the time of processes the processor 22 needs to execute in one cycle is equal to 25 ms in total. Thus, the processing time of the processor 22 in one cycle exceeds the assumed time 10 ms by about 15 ms.

In the comparative examples 1 and 2 in which the clock signal frequency is 400 kHz and 1 MHz, respectively, there may occur an event that processes to be executed by the processor 22 are occupied by I²C slave processes and a repetitive process cannot be executed.

In contrast, in the embodiment, the processing mode of each I²C slave process is set to one of the first processing mode and the second processing mode according to the processing time of a repetitive process. Where the processing time of a repetitive process is shorter than the threshold value Th and the processing mode is set to the first processing mode, next monitoring data is prepared after stopping of clock stretching as in the first comparative example. On the other hand, where the processing time of a repetitive process is longer than or equal to the threshold value Th and the processing mode is set to the second processing mode, clock stretching is stopped at the end of an I²C slave process after preparation of next monitoring data. In this case, as shown in FIG. 12, next monitoring data is prepared with clock stretching kept set and monitoring data is transmitted to the host apparatus 90 after stopping of the clock stretching. For example, in the I²C slave process M03, next monitoring data Data2 is prepared with clock stretching kept set and monitoring data Data1 is transmitted to the host apparatus 90 after stopping of the clock stretching.

In the embodiment, in the case where the processing mode is set to the second processing mode, the next I²C slave process (interrupt process) is not started until eight clocks (or nine clocks) are set after completion of one I²C slave process. For example, where the frequency of a clock signal is 400 kHz or 1 MHz, the time from the end of one I²C slave process to the start of the next I²C slave process is about 20 μs or 8 μs and the processor 22 can assign this period to execution of a repetitive process. As described above, in the control method of the optical transceiver 2, a repetitive process can be executed properly while monitoring data are transmitted to the higher-level host apparatus 90.

In the control method of the optical transceiver 2, a repetitive process that is executed by the processor 22 includes a process of controlling the operations of the laser diodes in the TOSA 4, a process of controlling the operations of the photodiodes in the ROSA 10, and a process of updating monitoring data stored in the RAM 26 according to results of the processes of controlling the operations of the laser diodes and the photodiodes.

In this control method, since the control of the laser diodes in the TOSA 4 and the photodiodes in the ROSA 10 and the update of monitoring data can be performed properly, proper transmission and reception of optical signals by the optical transceiver 2 can be continued and presence/absence of an abnormality in the optical transceiver 2 can be recognized at proper timing.

Transmission of monitoring data to the host apparatus 90 is performed according to the I²C standard. For example, the frequency of a clock signal is in a range of 400 kHz to 1 MHz.

A time taken to transmit one monitoring data is determined by the period of a clock signal (i.e., the time of one clock) and the number of bits of the monitoring data. Where the period of a clock signal is 1 to 2.5 μs, the time taken to read out second data as monitoring data to be transmitted next may become long relative to the time taken to transmit first data as one monitoring data, possibly causing a situation that a time to perform a repetitive process cannot be secured. In the above configuration, even where the period of a clock signal is 1 to 2.5 μs, the processing mode of an interrupt process is set to the second processing mode when the processing time of a repetitive process is long. As a result, a time to execute the repetitive process is secured and it can be executed properly.

The invention is not limited to the above embodiment as an illustration, and is defined by the claims and intended to include all modifications that are within the spirit and scope of the claims and their equivalents.

The control method of the optical transceiver 2 according to the embodiment can be employed in serial communications, other than I²C communications, performed between the host apparatus 90 and the optical transceiver 2.

The frequency range of a clock signal is not limited to 400 kHz to 1 MHz. The frequency of a clock signal may be either lower than 400 kHz or higher than 1 MHz.

In the above embodiment, the processing mode is set to the second processing mode (busy flag is on) when the timer value is equal to the threshold value Th. Alternatively, the processing mode may be set to the first processing mode (bust flag is off) when the timer value is equal to the threshold value Th.

The invention claimed is:

1. A control method of for optical transceiver configured to receive a clock signal from an apparatus via a clock signal line and transmit monitoring data stored in a memory unit to the apparatus via a data signal line in synchronism with the clock signal, the control method comprising the steps of:
   executing a plurality of internal processes repetitively in a specific order, the plurality of internal processes excluding serial communication with the apparatus via the clock signal line and the data signal line;
   updating monitoring data stored in the memory unit during execution of the plurality of internal processes;
   storing read-out monitoring data read out from the memory unit in a transmission register;
   transmitting, one-bit by one-bit, the read-out monitoring data stored in the transmission register to the apparatus via the data signal line in synchronism with the clock signal;
   in response to a command sent from the apparatus via the data signal line, interrupting the internal processes, stretching the clock signal whereby the transmission register suspends the one-bit-by-one-bit transmission of the read-out monitoring data, and subsequently executing an interrupt process before the transmitting step;
   measuring a processing time necessary to execute the interrupt process and one cycle of the plurality of internal processes; and
   setting a processing mode for the interrupt process to a first mode when the necessary processing time is shorter than a threshold value, and setting the processing mode to a second mode when the necessary processing time is longer than the threshold value,
   wherein the interrupt process includes:
      storing first monitoring data read out from the memory unit in the transmission register and stopping the stretching of the clock signal, and subsequently reading out second monitoring data from the memory unit to follow the first monitoring data, when the processing mode is set to the first mode, or alternatively,
      storing the first monitoring data read out from the memory unit in the transmission register and reading out the second monitoring data from the memory unit, and subsequently stopping the stretching of the clock signal, when the processing mode is set to the second mode.

2. The control method according to claim 1, wherein the processes of the plurality of internal processes include:
   controlling an optical transmission device configured to convert an electrical signal into an optical signal;
   controlling an optical receiving device configured to convert an optical signal into an electrical signal; and
   updating monitoring data stored in the memory unit according to results obtained in the process of controlling the optical transmission device and the process of controlling the optical receiving device.

3. The control method according to claim 1, wherein:
   the transmission of monitoring data to the apparatus is performed according to an I2C communication standard; and
   a frequency of the clock signal is in a range of 400 kHz to 1 MHz.

4. The control method according to claim 2, wherein:
   the transmission of monitoring data to the apparatus is performed according to an I2C communication standard; and
   a frequency of the clock signal is in a range of 400 kHz to 1 MHz.

5. An optical transceiver configured to receive a clock signal from an apparatus via a clock signal line and transmit monitoring data to the apparatus via a data signal line in synchronism with the clock signal, the optical transceiver comprising:
   a processor configured to execute a plurality of internal processes repetitively in a specific order, the plurality of internal processes excluding serial communication with the apparatus via the clock signal line and the data signal line;
   a memory unit configured to store therein the monitoring data, the monitoring data being updated during the execution of the internal processes;
   a communication interface circuit including a transmission register configured to store therein temporarily read-out monitoring data read out from the memory unit by parallel transmission and transmit the read-out monitoring data to the apparatus one-bit by one-bit via the data signal line in synchronism with the clock signal, wherein:
   the processor is configured to interrupt the internal processes in response to a command sent from the apparatus via the data signal line, to stretch the clock signal whereby the transmission resistor suspends the one-bit-by-one-bit transmission of the read-out monitoring data, and subsequently to execute an interrupt process;
   the processor is configured to measure a processing time necessary to execute the interrupt process and one cycle of the plurality of internal processes;
   the processor is configured to set a processing mode of the interrupt process to a first mode when the necessary processing time is shorter than a threshold value, and set the processing mode to a second mode when the necessary processing time is longer than the threshold value;
   the first mode allows the processor to store first monitoring data read out from the memory unit in the transmission register and stop the stretching of the clock signal, and subsequently read out second monitoring data from the memory unit to follow the first monitoring data, when the processor executes the interrupt process
   the second mode allows the processor to store the first monitoring data from the memory unit in the transmission register and read out the second monitoring data from the memory unit, and subsequently stop the stretching of the clock signal, when the processor executes the interrupt process; and
   the interrupt process includes storing the second monitoring data in the transmission register.

6. The optical transceiver according to claim 5, wherein the optical transceiver includes an optical transmission device and an optical receiving device, and wherein the internal processes executed by the processor include:
   controlling the optical transmission device to convert an electrical signal into an optical signal;
   controlling the optical receiving device to convert an optical signal into an electrical signal; and
   updating monitoring data stored in the memory unit according to results obtained in controlling the optical transmission device and controlling the optical receiving device.

7. The optical transceiver according to claim 5, wherein:
   the optical transceiver transmits monitoring data to the apparatus according to an I2C communication standard; and
   a frequency of the clock signal is in a range of 400 kHz to 1 MHz.

8. The optical transceiver according to claim 6, wherein:
   the optical transceiver transmits monitoring data to the apparatus according to an I2C communication standard; and
   a frequency of the clock signal is in a range of 400 kHz to 1 MHz.

\* \* \* \* \*